United States Patent [19]
Chisholm

[11] 3,881,825
[45] May 6, 1975

[54] PILOT LIGHT SIMULATOR
[75] Inventor: James J. Chisholm, Penfield, N.Y.
[73] Assignee: Bausch & Lomb Incorporated, Rochester, N.Y.
[22] Filed: Oct. 11, 1973
[21] Appl. No.: 405,720

[52] U.S. Cl. ................ 356/227; 250/227; 356/213
[51] Int. Cl. ............................................. G01j 1/44
[58] Field of Search ................... 350/96 R; 250/227; 356/213, 218, 227, 256, 226, 96 R, 213 R; 353/82; 324/20, 51

[56] References Cited
UNITED STATES PATENTS

| | | | |
|---|---|---|---|
| 1,457,426 | 6/1923 | Cameron | 350/96 R |
| 2,360,138 | 10/1944 | Johnson | 350/96 R |
| 3,375,751 | 4/1968 | Engborg et al. | 350/96 R |
| 3,565,535 | 2/1971 | Monell | 356/213 |
| 3,676,007 | 7/1972 | Kiess | 356/227 |

Primary Examiner—Harold A. Dixon
Attorney, Agent, or Firm—Frank C. Parker; Harry C. Post, III

[57] ABSTRACT

An operating indicator for use in a photometer that has a housing for encompassing the operating parts of the photometer including a light source. The light source is used to provide the necessary illumination in a photometric test. A bezel is formed on the housing in which the readout apparatus of the photometer is readily observable. The operating parts of the photometer, including the light source, are activated and deactivated by a switch controlling the power supply. A covering having two apertures is positioned about the light source. The first aperture allows light to pass through the covering with the light being used to take the photometric test. The second aperture permits light to pass through the covering to become seen at the bezel for indicating when the light source is operating.

1 Claim, 2 Drawing Figures

PATENTED MAY 6 1975　　　　　　　　　　　　　　　3,881,825

PILOT LIGHT SIMULATOR

BACKGROUND OF THE INVENTION

1. Field of the Invention

This invention relates generally to the use of an indicator light with a photometer to indicate when the light source of the photometer is operating.

2. Description of the Prior Art

In the prior art, an indicator light, commonly referred to as a pilot light, is frequently used for indicating the activation of a testing lamp being used in a photometer. This indicator light is normally a separate light bulb connected to the housing of the photometer and is readily viewable by the photometer operator. Normally, the indicator light is activated by the power supply that provides the power to activate the testing lamp of the photometer, thereby necessitating separate circuitry for the indicator light within the photometer. A problem can arise from this prior art arrangement when the indicator light is inoperable and the testing lamp is operable because the indicator light will indicate that the testing lamp is not operating, but in actuality is operating when the photometer is activated. Accordingly, the photometer is disassembled to replace the testing lamp and a substantial amount of the operator's time is wasted in attempting to replace a testing lamp that does not need replacement. Another problem can arise from this prior art arrangement when the indicator light is operable and the testing lamp is inoperable because when the photometer is activated the indicator light indicates the testing lamp is operating, but in actuality the lamp is not operating. Involved with this problem is the knowledge that it takes approximately 15 minutes for a typical photometer to warm-up before an accurate test may be run. Further, the operator does not normally stay in close proximity with the photometer, but is commonly employed elsewhere during the warm-up time. Accordingly, it would take at least 15 minutes before the operator discovers that the testing lamp in the photometer is not operating before the operator can start to repair the photometer by replacing the lamp.

SUMMARY OF THE INVENTION

In accordance with the invention a pilot light simulator is positioned within the housing of a photometer to indicate whether the photometer is operating. A bezel is formed on the housing in which the readout apparatus of the photometer is readily viewable. Located within the housing is a light source that provides the necessary illumination for a photometric test. A switch connected to a power supply activates and deactivates the photometer and provides like service for the operating indicator. A covering having first and second apertures is positioned within the housing and encloses the light source. The first aperture is to allow light to pass outwardly of the light source with this light being used in the photometric test. The second aperture within the covering permits light to pass therethrough to become visible at the bezel for indicating when the light source is activated. Accordingly, this simplified indicator light is operable without a separate light bulb and associated circuitry and only when the light source used in the photometric test is being used.

BRIEF DESCRIPTION OF THE DRAWINGS

The objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
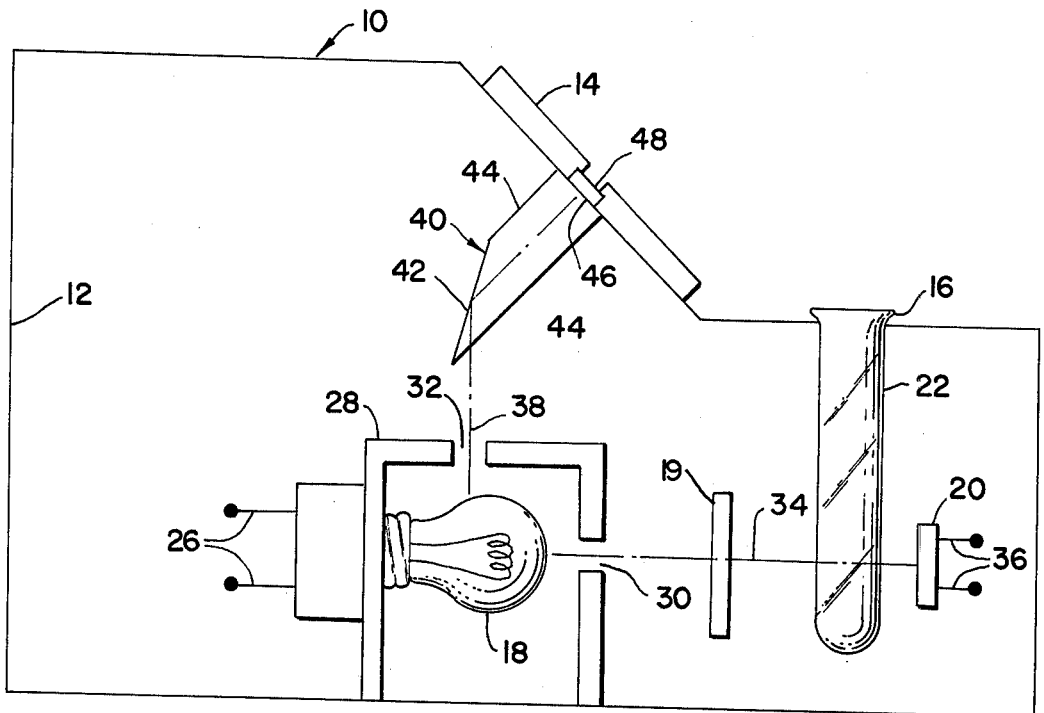
FIG. 1 is a fragmentary elevation of one embodiment of the present invention.

Turning now to the drawings, and more particularly to FIG. 1, a photometer, such as a spectrophotometer or a colorimeter, generally designated as 10 is typically provided with a housing 12, bezel 14 (having readout meter 55 positioned therein), sampling access port 16, light source 18, wavelength isolating means 19, and sensor 20. The positioning of port 16 relative to light source 18, lightwave isolator 19 and sensor 20 is such that when a sample container 22 is inserted into port 16, a specimen carried within container 22 is positioned between lightwave isolator 19 and sensor 20 ready for a photometric test. A commonly used sample container 22 is a test tube with aperture 16 being of such a diameter as to permit the passage of the test tube body and yet of sufficiently small diameter to reduce the passage of stray light into housing 12.

The light source 18 used in providing the necessary light to run a photometric test is normally located within photometer 10. This light source may be of a basic visible source or of an ultraviolet source, in the preferred embodiment a basic visible incandescent source (excitor lamp) is used. Light source 18 is connected to a light socket 24 for supplying electrical power to said light source 18 from electrical conductors 26. Light socket 24 is attached to light source cover 28 for positioning light source 18 within the enclosure formed by cover 28. A first aperture 30 and a second aperture 32 are provided within cover 28 to permit the passage of light from light source 18. A first light path 34, passing through first aperture 30, passes through wavelength isolator 19 and test tube 22 prior to striking sensor 20 when a photometric test is being run. The amount of light impinging on sensor 20 is then converted to an electrical output, which is carried by electrical conductors 36.

A second light path 38, which passes through second aperture 32, travels upwardly to a prism 40 which is connected to bezel 14. Prism 40 is formed from a conventional optical material having an angled surface 42, parallel surfaces 44, and end surface 46. Positioned at end surface 46, abutting an opening in bezel 14, is a colored translucent element 48 to aid in the visual determination of whether light source 18 is activated.

Figure 2:
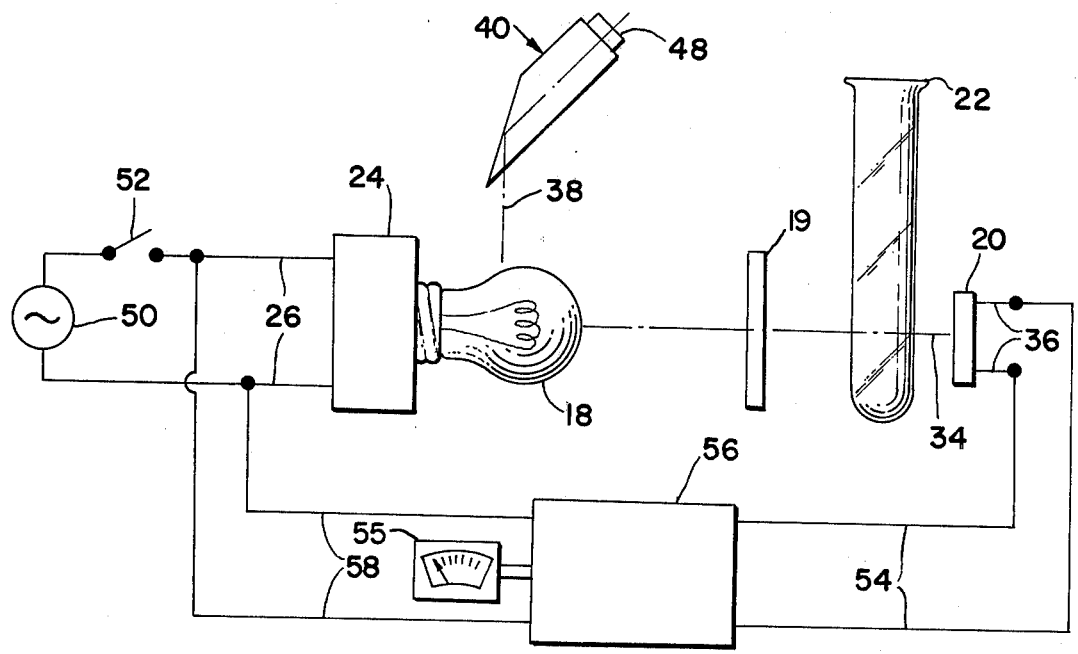
FIG. 2 is a schematic of the operating elements of the embodiment shown in FIG. 1.

As best shown in FIG. 2, a power source 50, electrically connected to switch 52, is connected through conductors 26 and light socket 24, to activate light source 18. Further, conductors 36 are connnected via conductors 54 for supplying the electrical output from sensor 20 to a readout meter 55 via testing circuitry 56 of photometer 10. The power supply 50 and switch 52 simultaneously supply electrical power to sensor 20 and circuitry 56 via conductors 58.

To operate photometer 10 switch 52 is closed, thus supplying power from power source 50 to lamp 18, sensor 20, and circuitry 56. If lamp 18 is activated when switch 52 is closed, the light following second path 38 will pass through second aperture 32 to prism 40, reflected by angled surface 42, travel parallel to surface 44 and impinge on colored translucent element 48 to indicate when the lamp is activated. By this direct use of light from light source 18 to indicate its activation, there is no question that light source 18 is activated when the pilot light simulator so indicates. The remainder of the test run by an operator using photometer 10 would be of a conventional nature after the 15 minute warm-up time had passed and none of the operator's time would be wasted by his mistakenly changing an operable lamp 18 or trying to operate instrument 10 with a burned out lamp 18. If lamp 18 is not activated when switch 52 is closed, there will be no visual indication from colored translucent element 48, thereby eliminating the possibility of an incorrect indication that lamp 18 is activated when in actuality lamp 18 is inactive. Lamp 18 can therefore be changed upon the lack of visual indication from colored translucent element 48 and it is not necessary for the operator to wait for the 15 minutes of warm-up time to pass before discovering that lamp 18 is inactive. Accordingly, the possibility of wasting at least 15 minutes of the operator's time is eliminated.

Thus, it is apparent that there has been provided, in accordance with the invention, a pilot light simulator that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to encompass all such alternatives, modifications and variations, as followed within the spirit and broad scope of the appended claims.

I claim:

1. An operating indicator used in a photometer, comprising:

a housing for encompassing the elements of a photometer;

a light source disposed within said housing for providing the necessary illumination for a photometric test;

means for supplying electrical power to said light source and capable of activating and deactivating said photometer simultaneously with said light source;

switching means for activating and deactivating the electrical power when supplied by said power supplying means;

a cover enclosing said light source having first and second apertures provided therein, a first light path for taking the photometric test being formed by light passing through the first aperture and a second light path for indicating the activation of said light source being formed by light passing through the second aperture; and a bezel located on said housing, a colored translucent element disposed in said bezel for aiding in observing the activation of said light source and a prism connected to said bezel for reflecting light from said second light path to impinge on said colored translucent element.

* * * * *